(12) United States Patent
Selig et al.

(10) Patent No.: US 6,832,528 B2
(45) Date of Patent: Dec. 21, 2004

(54) LOAD CELL

(75) Inventors: Klaus Peter Selig, Balingen-Weilstetten (DE); Klaus Wurster, Pliezhsusen (DE)

(73) Assignee: Bizerba GmbH & Co. KG, Balingen (DE)

( * ) Notice: Subject to any disclaimer, the term of this patent is extended or adjusted under 35 U.S.C. 154(b) by 0 days.

(21) Appl. No.: 10/698,319

(22) Filed: Oct. 31, 2003

(65) Prior Publication Data

US 2004/0149050 A1 Aug. 5, 2004

Related U.S. Application Data

(63) Continuation of application No. PCT/EP02/04769, filed on Apr. 30, 2002.

(30) Foreign Application Priority Data

May 1, 2001 (DE) .......................................... 101 20 976

(51) Int. Cl.$^7$ ................................................. G01L 1/04
(52) U.S. Cl. ................................................. 73/862.636
(58) Field of Search ...................... 73/862.629, 862.631, 73/862.632, 862.633, 862.634, 862.635, 862.636

(56) References Cited

U.S. PATENT DOCUMENTS

| | | | | |
|---|---|---|---|---|
| 4,478,089 A | * | 10/1984 | Aviles et al. | 73/862.044 |
| 4,558,600 A | * | 12/1985 | Lee | 73/862.626 |
| 4,750,082 A | * | 6/1988 | Gerety | 361/283.1 |
| 4,866,383 A | * | 9/1989 | Taliaferro | 324/228 |
| 5,079,508 A | * | 1/1992 | Corain et al. | 324/110 |
| 5,302,894 A | | 4/1994 | Hrubes | |
| 5,327,786 A | | 7/1994 | Guillet et al. | |
| 5,498,017 A | * | 3/1996 | Rohrmoser | 280/633 |
| 5,705,751 A | | 1/1998 | Briefer et al. | |
| 5,942,697 A | * | 8/1999 | Hesthamar et al. | 73/862.69 |
| 6,491,647 B1 | * | 12/2002 | Bridger et al. | 600/585 |

FOREIGN PATENT DOCUMENTS

| | | |
|---|---|---|
| DE | 39 10 297 C2 | 10/1990 |
| DE | 40 40 197 A1 | 6/1992 |
| DE | 42 33 325 A1 | 4/1994 |
| DE | 44 20 691 C1 | 1/1996 |
| DE | 196 46 056 C2 | 5/1998 |

OTHER PUBLICATIONS

Förster et al., "Theoretische und experimentelle Grundlagen der zerstörungsfreien Werkstoffprüfung mit Wirbelstromverfahren," Chapters III and IV, *Metallkunde*, 45, 180–187.

* cited by examiner

*Primary Examiner*—Max Noori
(74) *Attorney, Agent, or Firm*—Leydig, Voit & Mayer Ltd.

(57) ABSTRACT

In order for a load cell with a force transducer for recording a weight, the force transducer having a part which does not deform under loading and a force introduction part with an elastically deformable part, the elastically deformable part and the non-deforming part having in a measuring portion a defined spacing in relation to each other which changes under loading, with a sensor arrangement with an inductively operating sensor element, which is disposed in the measuring portion opposite a signaling face, in order to detect changing of the spacing as an electric signal, and with a circuit for converting the electric signal into a weighing signal, to be developed further in such a way that it can be used in particular in conditions which are very difficult in terms of measuring technology, and in particular under the other special ambient conditions within a vehicle, and the weighing signal of which is substantially uninfluenced by this, it is proposed that the force transducer has a recess in the elastically deformable part or the non-deforming part in the region of the measuring portion lying opposite the signaling face and in that the sensor element is disposed in the recess in such a way that it is aligned toward the signaling face and is encapsulated.

18 Claims, 3 Drawing Sheets

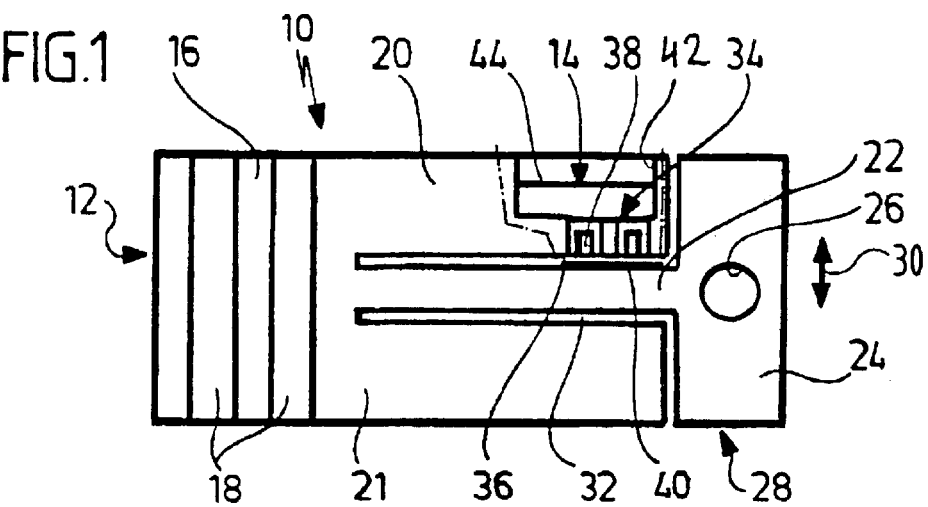
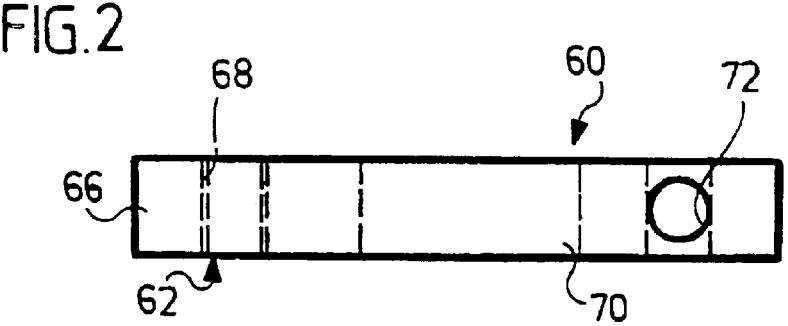
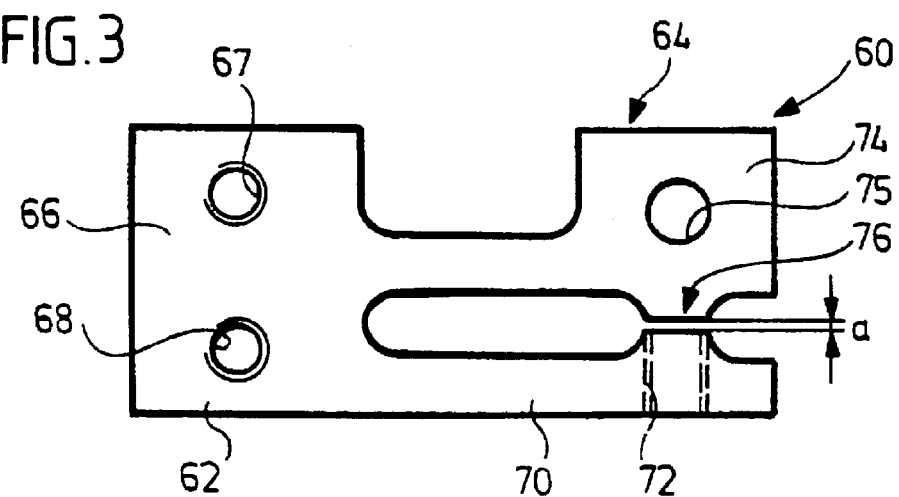

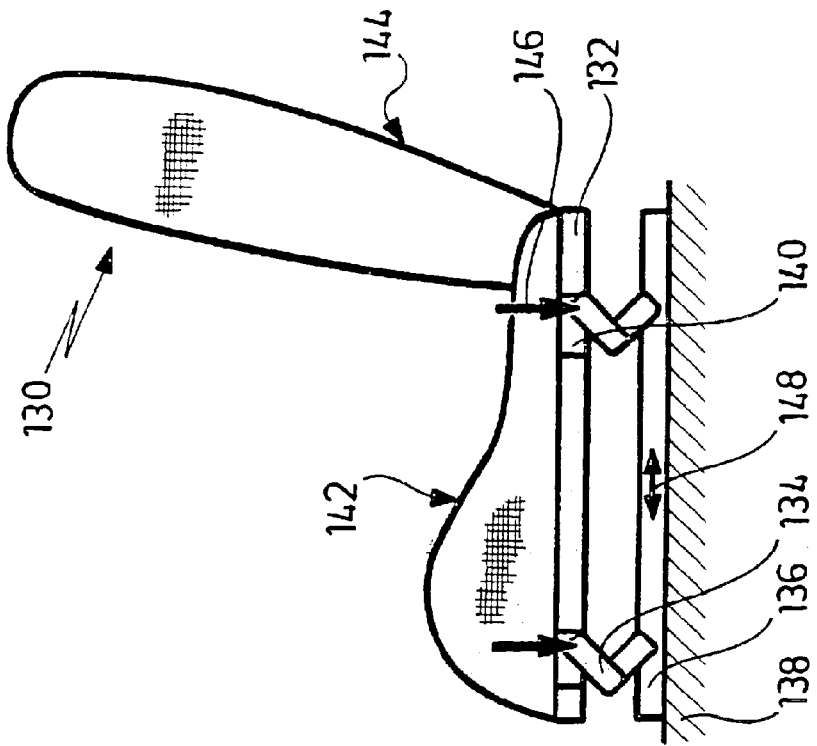
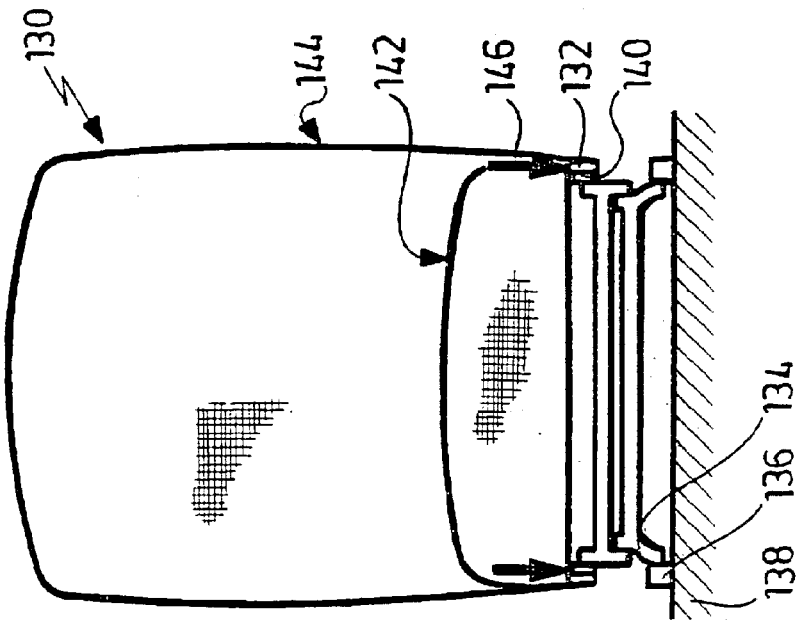

LOAD CELL

The present disclosure relates to the subject matter disclosed in German application No. 101 20 976.2 of May 1, 2001, which is incorporated herein by reference in its entirety and for all purposes. This application is a continuation of PCT/EP02/04769, filed Apr. 30, 2002 which claims priority to German application No. 101 20 976.2.

BACKGROUND OF THE INVENTION

The invention relates to a load cell with a force transducer for recording a weight, the force transducer having a part which does not deform under loading and a force introduction part with an elastically deformable part, the elastically deformable part and the non-deforming part having in a measuring portion a defined spacing in relation to each other which changes under loading, with a sensor arrangement with an inductively operating sensor element, which is disposed in the measuring portion opposite a signaling face, in order to detect changing of the spacing as an electrical signal, and with a circuit for converting the electrical signal into a weighing signal.

Such a load cell is known for example from DE 44 20 691 C1.

Other known force transducers are in many cases based on the deformation being detected as a surface expansion. Typical of these are strain-gage transducers, in which the surface expansion occurring when there is deformation is converted into a change in electrical resistance.

These strain-gage transducers achieve very high degrees of accuracy, but can be protected against ambient influences only with great effort, since the strain-sensitive sensor elements are located directly on the elastically deforming part and covering of the sensors has the concomitant effect of force bypasses, which have direct adverse effects on the properties of the transducer.

In the case of capacitively operating load cells, the elastically deformable part is connected to an electrode of a plate capacitor, deformation of the elastically deformable part caused by the force to be measured producing a change in capacitance.

The inductively operating load cell known from DE 44 20 691 C1 is designed specifically for applications in weighing technology and proves to be unsuitable under extreme ambient conditions, in particular such as occur for example in a motor vehicle when detecting the weight of occupants, since it is too susceptible to interference.

For such an application, a load cell must have the following special properties:

The load cell must have compact outside dimensions, in order to conform to the very confined installation space in the case of such applications. At the same time, it must be mechanically stable, to be able to withstand the very great forces possible in the operation of a motor vehicle.

The load cell must be designed with respect to the sensor element and measured value conversion in such a way that the very high ambient field strengths possible in a motor vehicle do not have any harmful influence on the measuring accuracy. For instance, electrical field strengths of up to 200 V/m can occur in a motor vehicle, an extremely high value in comparison with industrial ambiences of 10 V/m.

The load cell must be capable of operating in a large operating temperature range of from −40° C. to +85° C. with rapid temperature changes and also possible condensation.

The load cell must be able to withstand very high numbers of stress cycles, as occur in the operation of a vehicle due to the forces of acceleration, without the technical measuring properties changing.

In the course of introducing airbags as standard for the passenger seat in motor vehicles there arises the problem of detecting the occupancy of the seat, so that the passenger airbag is released for firing only in those cases in which the seat is occupied. Firing of the passenger airbag when the passenger seat is not occupied not only has the consequence that an additional increase in pressure in the vehicle is unnecessarily caused in the event of an accident by the firing of the passenger airbag, but also that, due to the integration of the passenger airbag into the dashboard, considerable repair measures are necessary in the passenger compartment of the vehicle following firing of the airbag.

Various problems which have been observed when airbags are fired with small children or youngsters traveling on the passenger seat have ultimately led to the requirement that, in the event of an accident, an airbag must be operated in a way which is adapted to the person sitting on the vehicle seat.

This gives rise to the problem of determining the necessary data for firing the airbag in a way appropriate for requirements.

One possible reference point is to detect the weight of the respective vehicle occupant, the size and physical robustness of the occupant then being concluded on the basis of a weight determination.

The invention therefore relates in particular to a load cell which can be used in ambiences with extreme conditions, for example in a motor vehicle.

In terms of measuring technology, the vehicle interior is extremely problematical, since not only do interference signals of the engine ignition (electromagnetic fields with high field strengths) occur to a considerable extent and have to be eliminated in signaling terms, but it is also necessary with respect to the functional capability of sensors that are to be used to take into account extreme vibrations, temperature conditions in a range from, for example, −40° C. to +85° C., rapid temperature changes and also atmospheric humidity ranging right up to the dew point.

Furthermore, account must be taken of the fact that not only the weights of the occupants act on the seat but also, when the vehicle accelerates and, in particular, decelerates suddenly, forces which are many times greater, not to mention the forces occurring in an accident situation, which likewise must not lead to malfunctioning of the sensors.

As well as this there are the various adjusting possibilities for a vehicle seat which are provided in modern motor vehicles and may only influence the measuring result within defined limits.

SUMMARY OF THE INVENTION

It is therefore an object of the invention to develop a load cell of the type described at the beginning further in such a way that it can be used in particular in conditions which are very difficult in terms of measuring technology, and in particular under the other special ambient conditions within a vehicle when detecting the weight of occupants, and the weighing signal of which is substantially uninfluenced by this.

This object is achieved in the case of the load cell stated at the beginning according to the invention by the force transducer having a recess in the elastically deformable part or the non-deforming part in the region of the measuring portion, by the sensor element being disposed in the recess such that it is shielded against external electromagnetic fields and encapsulated, and by the load cell operating on the eddy current principle.

The load cells operating inductively according to the invention can be constructed in such a way that they are very insusceptible to interference and in particular also very robust, which is of special significance in the case of installation in a seat of a motor vehicle, since great forces can act on the seat even in normal driving operation, during acceleration and deceleration. In the event of an accident, the forces acting on the load cell are many times greater.

On account of the sensor element being disposed in a recess in the measuring portion of the force transducer, protection against mechanical effects on the sensor element is obtained. Since, furthermore, the force transducer is generally produced from metallic material, for example steel or aluminum, shielding against electromagnetic interference fields is also provided as a result.

In spite of the shielding against electromagnetic interference fields, the sensor arrangement is permeable to electromagnetic fields on its side facing the signaling face, dependent on its functional type.

On account of the real part of the measuring signal being evaluated (complex permeability) and the imaginary part ignored, shielding against electrical fields is of no importance. There is no need for shielding intended for this purpose.

The encapsulation allows influences of temperature and atmospheric humidity to be suppressed or even eliminated entirely.

The load cell according to the invention based on the eddy current principle can be constructed in such a way that it is very insusceptible to interference if the sensor effect occurring, in the case of such a load cell, of the change in the real part of the complex permeability of the sensor element is utilized. With respect to the physical effects of this process, you are referred to [Förster, Stambke, Zeitschrift für Metallkunde [Journal for Metallurgy], 4, 45, 1954].

Utilizing this sensor effect allows the sensor element to be used as a frequency-determining element of an oscillator, so that the variable to be measured comprising the weight can be converted into a change in frequency. The output voltage of the oscillator is brought to a relatively high voltage level, of for example about 12 volts, by a downstream level converter.

The advantage of such an arrangement is that the part of the sensor arrangement that is sensitive to external interference fields, that is to say the oscillator circuit and the sensor element (the coil), can be disposed in a very compact and well-shielded manner in the interior of the metallic load cell. The frequency-analogous output signal with a high signal level can then be led to the outside unproblematically, without the risk of the measuring signal being impaired by external electromagnetic interference fields. At the same time, this arrangement also permits easy shielding with respect to other ambient conditions, such as aggressive substances and moisture.

A further advantage of such an arrangement is that such a frequency-analogous output signal can be evaluated by a downstream signal-processing unit very simply, by digital counter circuits that are simple to realize.

A sensor element operating on the eddy current principle is preferably used. Also preferred are those sensor elements in which the weighing signals occur analogously to frequency, since in this case a particularly great and interference-immune signal is obtained. These sensor elements have the further advantage that the weighing signals can be evaluated and further processed in a simple manner.

The recess is preferably disposed in a part of the force transducer which is not deformed. This allows simple cable routing of the signal cables of the load cell and reduces the extent to which the weighing signal is influenced by the latter. The signaling face is then disposed on the elastically deforming part in the region of the measuring portion.

Various solutions for the encapsulation of the sensor element are available.

In the case of a preferred variant, the sensor element disposed in the recess is cast with a curable material.

In the case of another preferred variant, the sensor element is separately encapsulated in a separate housing and is fitted and fixed in the recess together with the housing.

For simple and reliable mounting, even in the case of possibly necessary exchange, the recess is provided with a stop, which allows exact positioning of the sensor element with respect to the distance from the signaling face.

A solution which is simple in production engineering terms is provided by the recess being formed as a through-bore, the housing of the sensor element having a stop for the exact positioning within the bore.

The stop may be, for example, a collar protruding from the housing of the sensor element.

The housing of the sensor element is preferably formed in a substantially cylindrical manner and provided on its cylinder wall with an external thread, the bore of the recess being provided with a complementary internal thread.

The construction of the sensor element itself has so far not been discussed in any detail. It is to be recommended in particular with regard to the aimed-for immunity to interfering factors to construct the sensor element with a ferrite core and a sensor coil disposed in the ferrite core, the ferrite core being formed such that it is open for the passing through of magnetic fields on the side which in the installed state is facing the signaling face. Apart from the shielding of the sensor coil, the measuring effect is also maximized.

The ferrite core may in this case be formed as an open cup core (pot core), as an E core or as a U core.

In the case of a particularly preferred type of construction, the sensor element is disposed as half a pot core in a bore of the force transducer, its magnetic field spreading out in a relatively narrow measuring gap.

A further preferred type of construction of the transducer is that the force transducer, which comprises a non-deforming part fixed to the frame, an elastic deforming part, a force introduction part and also recesses for the sensor arrangement, is to be produced from one piece of a metallic material. This material preferably comprises a curable non-magnetic lightweight metal alloy. In this case, the recess preferably receives, at least partially, not only the sensor element but also the associated sensor electronics.

This has the following advantages:

Curable lightweight metal alloys not only have very good tensile strength, but also withstand high numbers of load stress cycles without impairment. Both are properties which are absolutely necessary for the described use in motor vehicles.

Since such substances are non-magnetizable (the magnetic permeability is around 1), there can also be no subsequent effects on the technical measuring properties. Magnetizable technical materials (steel), which seem appropriate because of their very good mechanical properties, vary greatly in their magnetic properties (to be more precise in their magnetic permeability) for production reasons, leading to subsequent effects on the behavior of the weight sensor which are difficult to control.

Preferably used for the conversion of the deformation occurring when the force transducer is subjected to loading, and the associated change in inductance, into a measuring signal suitable for further evaluation is either a bridge measuring method or else, preferably, an oscillator circuit, which is preferably disposed alongside the sensor element and is encapsulated together with the sensor element in the recess. The sensor element preferably represents a frequency-determining part of the oscillator circuit. This allows the aforementioned advantages to be realized.

In the case of this method, the change in inductance when there is alternating loading of the load cell produces changes in the frequency of the oscillator. This allows a signal which is analogous to the frequency to be generated, with which the further signal transmission can be performed with levels which are very immune to interference (for example TTL). This method also permits very simple further signal processing, since only counters which can be easily read out by commonly used microcontrollers are necessary for the representation of a measured value. Such counters may already be provided in the recess of the force transducer as part of the circuit, preferably integrated into a so-called ASIC chip.

To achieve easily reproducible qualities of the signaling face, it is preferably formed by a composite ferrite-polymer sheet, which is disposed in the measuring portion of the force transducer opposite the sensor element. In the case in which the force transducer is produced from an aluminum alloy, in this case a certain signal gain is also obtained, whereas the advantage of the composite ferrite sheet in the case of force transducers made of steel lies rather in the fact that compensation is provided for the differences frequently observed with this material in the magnetic behavior.

What is more, with the composite ferrite-polymer sheet, the properties of ferrites (high measuring signal) are combined with the easy handling (deformability, adaptability) of plastic sheets.

In order to protect the force transducer from mechanical overloading, the non-deforming part of the force transducer may be formed as a mechanical stop for deformation of the deformable part of the force transducer. If the permissible limit loading of the force transducer is exceeded, the elastically deformable part comes up against the non-deforming part and is supported there. Consequently, excessive loading is avoided, and consequently so too is excessive deforming of the force-introducing part. This measure can be performed in twofold manner, that is to say with regard to expected tensile forces and compressive forces.

In the case of a particularly preferred embodiment, finally, not only the sensor element, and possibly parts of the circuit, but also the sensor arrangement are disposed altogether in the recess. If the entire sensor arrangement is encapsulated in a separate housing, it can be exchanged in an extremely simple way, comparable to a spark plug.

On account of the configuration of the load cells according to the invention, they can be disposed between the seat frame and the supporting frame of a vehicle seat, it being possible to obtain a weight signal which is independent of the position in which the vehicle seat happens to be at the time, seen in the longitudinal direction of the vehicle, and also to allow further adjusting possibilities of the seat, for example height adjustment, setting the inclination of the backrest, pivoting the sitting area about an axis transverse to the longitudinal direction of the vehicle etc., without the measuring signal being falsified to an inadmissible extent as a result.

When the load cells according to the invention are used for weight determination in a vehicle seat, either the seat frame may be connected to the non-deforming part of the force transducer and the supporting frame connected to the elastically deformable part, or else vice versa, the seat frame connected to the elastically deforming part of the force transducer and the supporting frame connected to the non-deforming part of the force transducer, so that the force transducer preferably creates a direct connection between the seat frame and the supporting frame.

In order to realize a relatively high degree of accuracy for the weight measurement, the seat frame is preferably connected to the supporting frame via three or more load cells. Most preferred is an arrangement of four load cells for connecting the seat frame and supporting frame, for example alongside the four corner regions of a sitting area.

The use of three or more load cells in connection with the present invention additionally has the advantage that the force transducers can then be disposed in such a way that the so-called H point (hip point) of the seat position in the vehicle is not increased, or at most is increased insignificantly.

The mounting possibility proposed above as being preferred, that is to say mounting the seat frame on the one hand and the supporting frame on the other hand directly on the non-deforming part of the force transducer and on the elastically deforming part of the force transducer respectively, often even brings the advantage that the H point can be placed slightly lower.

The H point is of interest because it constitutes part of a vehicle registration and is an indirect measure of the headroom of the vehicle. Changing the H point beyond an amount which is fixed—according to the vehicle type—inevitably means that a change which necessitates renewed registration of the entire vehicle is made.

When three or more load cells are used, shifts of the center of gravity of the person sitting on the vehicle seat can in addition also be registered and taken into account in the evaluation of the weighing signals.

BRIEF DESCRIPTION OF THE DRAWINGS

These and further advantages of the invention are specifically explained in still more detail below on the basis of the drawings, in which specifically:

FIG. 1 shows a schematic representation of a load cell according to the invention;

FIGS. 2 and 3 show a plan view and side view of a further embodiment of a load cell according to the invention;

FIGS. 6A and 6B show schematic front and side views of a vehicle seat with load cells according to the invention.

DESCRIPTION OF INVENTION EMBODIMENTS

Figure 4:
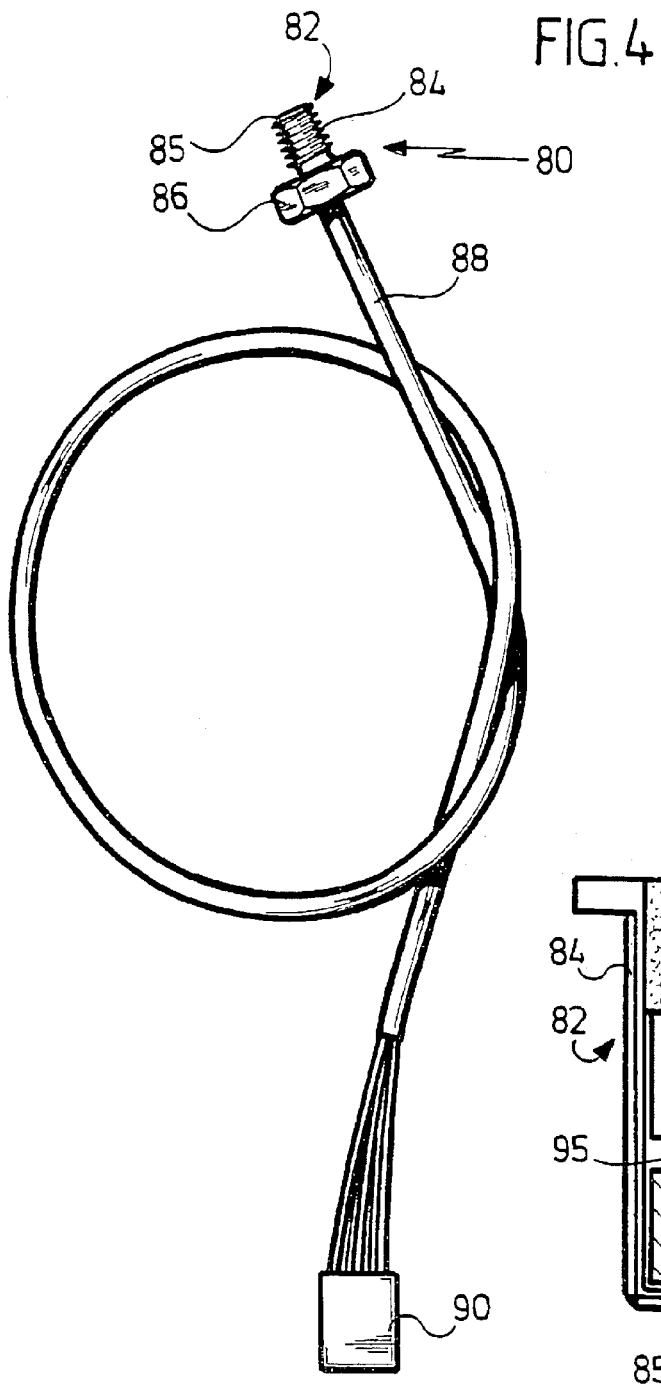
FIG. 4 shows a schematic representation of a sensor for a load cell as shown in FIGS. 2 and 3.

FIG. 1 shows a load cell according to the invention, provided as a whole with the reference numeral 10, with a force transducer 12 and a sensor arrangement 14 operating inductively on the eddy current principle.

The force transducer 12 comprises a part 16 which can be fixedly mounted and has two bores 18, with which the fixed mounting of the force transducer 12 can take place by means of screw bolts (not represented).

The load cell 10 is in this case formed in one piece, preferably from an aluminum alloy (for example $AlCuMg_2$).

From the fixedly mountable part 16 of the force transducer 12 there extend two substantially parallel projections 20, 21 with a defined spacing from each other. These projections 20, 21 are formed as non-deforming parts of the force transducer 12.

Between the two parallel projections 20, 21 there extends from the fixed part 16 an elastically deformable part 22, which has at its free end a mounting portion 24 with a bore 26. Altogether, the elastically deformable part 22 and the mounting portion 24 are referred to hereafter as the force introduction part 28.

In the load-free state, the non-deforming projections 20, 21 and the elastically deformable part 22 extend with a constant spacing in relation to each other.

If a force acts on the force introduction part 28, the mounting portion 24 moves downward or upward in the sense of the double-headed arrow 30, according to the direction of force introduction. As a result, the gap existing between the elastically deformable part 22 and the non-deforming part 20 or 21, i.e. the spacing of the elastically deformable part 22 in relation to the non-deforming parts 20, 21, is increased or reduced.

This changing of the spacing is detected by a sensor arrangement 14 disposed in a measuring portion and supplies a weighing signal corresponding to the force acting.

The sensor arrangement 14 has for this purpose a sensor 34 operating inductively on the eddy current principle with a magnetic cup core 36 and a coil 38 disposed in the cup core. On account of the deformation of the elastically deformable part 22 under the effect of force on the mounting portion 24, the spacing of the sensor 34 in relation to the surface lying opposite (=signaling face) of the elastically deformable part 22 increases or decreases, whereby an electric signal is induced in the coil 38 or the inductance of the coil 38 is changed.

The real part of the measured complex permeability is evaluated by sensor electronics preferably disposed in the projection 20. The part of the measuring signal that is more sensitive to interference, that is to say the imaginary part of the complex permeability, is not taken into account in the evaluation.

This signal can be amplified by disposing a composite ferrite sheet 40 on the signaling face of the elastically deformable part 22.

The sensor arrangement 14 itself is disposed in a recess 42 of the non-deforming part (projection 20) of the force transducer 12 and is consequently already protected against mechanical damage. At the same time, the metallic surrounding acts as protection against electromagnetic interference fields.

Preferably, as represented in FIG. 1, a further part of the sensor arrangement, that is to say at least part of the sensor electronics 44 (oscillator and level converter), is disposed in the recess 42. The entire sensor electronics of the sensor arrangement may possibly also be disposed in the recess 42, so that all that remains is for the load cell 10 to be provided with an electrical line (not represented), in order to connect it to an evaluation circuit (not represented) for the weighing signal.

Once the sensor 34 and the sensor electronics 44 (in particular oscillator and level converter) are disposed in the recess 42, the space still remaining above can be cast with a curable composition, so that the sensor 34 and the sensor electronics are protected and encapsulated not only against mechanical influences but also against the influences of temperature and moisture.

A further example of a force transducer 60 according to the invention is represented in FIGS. 2 and 3.

The force transducer 60 is again formed in one piece and comprises a non-deforming part 62 and an elastically deformable part 64. The non-deforming part 62 comprises as a fixed part a mounting portion 66, which has two bores 67, 68, and also a signaling part 70, which extends away from the mounting portion 66 and in which a through-bore 72 is provided alongside its free end.

The force transducer 60 is, in its basic form, a rectangular, plate-shaped component, clearances being used to form the elastically deforming part 64 in such a way that it has a mounting portion 74 and a signaling portion 76. The mounting portion 74 comprises a bore 75, via which the elastically deformable part 64 can be connected for example to the supporting frame or else, conversely, to the seat frame.

The signaling face 76 of the elastically deformable part 64 lies opposite the opening of the through-bore 72 of the elongated sensor holding part 70. The spacing a between the signaling face 76 and the opening of the through-bore 72 preferably lies in the range of about 1 mm.

The bore 72 can receive a sensor element, as described in more detail below on the basis of FIGS. 4 and 5.

In particular, the through-bore 72 makes it possible for an inductive sensor to be disposed in the force-transducer part in an encapsulated form, for example by the sensor element disposed in situ being cast with synthetic resin and consequently shielded against ambient influences, or else, as represented in FIG. 4, by the sensor part being fitted into the bore 72 as a separate encapsulated component.

FIG. 4 shows a sensor element 80 with a housing 82, which has on its outer side a thread 84. At its free end 85, the inductive sensor, operating on the eddy current principle, has an encapsulation which is hermetically sealed but permeable to magnetic fields, while at the opposite end of the cylindrical housing a hexagon 86 is formed in such a way as to protrude radially. Connected to this end of the sensor 80 there is then a signal cable 88, which preferably ends in a plug-in connection 90.

Figure 5:
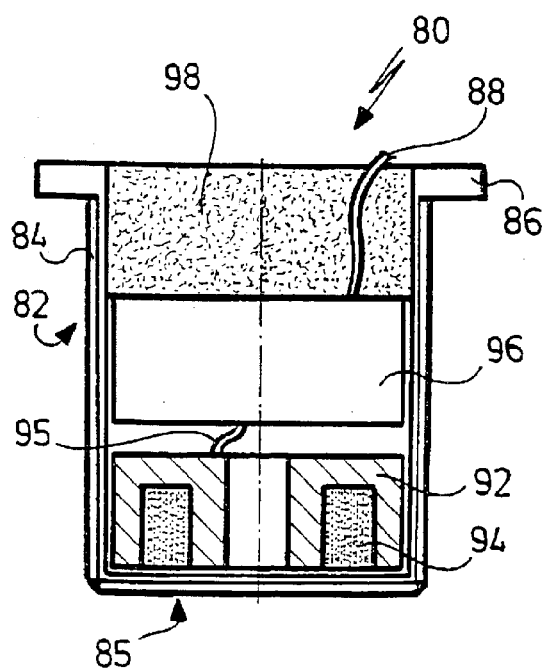
FIG. 5 shows a sectional view through a sensor of a load cell used according to the invention.

The construction of the sensor 80 can be seen more precisely from FIG. 5. This sectional view in the longitudinal direction of the housing 82 of the sensor 80 is the arrangement of an annular ferrite cup core 92, which receives a coil 94 in its open recess. The open side of the cup core 92 faces toward the open free end of the housing 82. The housing is hermetically sealed with respect to ambient influences, but permeable to magnetic fields, at the free end 85.

The coil 94 is connected via an electrical line 95 to sensor electronics 96 comprising an oscillator and a level converter, which altogether provide on the output side, via the cable 88, the actual weighing signal of the sensor of the force transducer. On the side of the hexagon 86, the housing 82 is closed by a casting composition 98 and is consequently encapsulated against ambient influences. The sensor 80 can then be screwed with its screw thread 84 into the bore 72 of the force transducer 60 of FIGS. 2 and 3, the hexagon 86 at the same time forming a stop and consequently providing a defined seating of the sensor element 80 in the axial direction within the bore 72 of the force transducer 60.

It is clear from the description above that the vehicle seat according to the invention is suitable not only for motor vehicles or automobiles, but also for example as a seat in aircraft, the possibility of performing a very exact estimate of the total mass of the passengers being transported then being provided there. This has advantages in the estimation of the reserves of fuel to be carried or, evaluated differently, in the calculation of an additionally possible cargo load.

The signal cable 88 is connected via the plug-in connection 90 to evaluation electronics (not shown), which pre-processes the weighing signal of the sensor 80 or of the force transducer 60, possibly with further weighing signals of further load cells mounted on the vehicle seat, and provides the vehicle electronics with a signal which is, for example, a signal differentiating different weight classes and consequently can be used directly for the activation of multiple airbags capable of being fired.

FIGS. 6A and 6B show a vehicle seat 130 in a front view and side view, respectively, with a seat frame 132 and a supporting frame 134. The supporting frame 134 is secured displaceably in the longitudinal direction of the vehicle on rails 136 on a vehicle floor 138. In the present example, the supporting frame 134 is adjustable in height and holds the seat frame 132 at four points. The connection between the supporting frame 134 and the seat frame 132 takes place by means of load cells with a force transducer, the force transducer having a non-deforming part and an elastically deformable part. One of the two parts is mounted on the seat frame 132, the other, respectively, is mounted on the supporting frame 134. Held on the seat frame 132 is a sitting area 142 and also a backrest 144. If a weight then acts on the vehicle seat 130 in the sense of the arrows 146, the weighing signal generated by the load cells 140 remains independent of the height setting of the sitting area 142.

By the load cells 140 being disposed according to the invention between the supporting frame and the seat frame, upward shifting of the so-called H point is avoided. In many designs of seat it is even possible to gain a certain height for the H point, i.e. the latter can be placed lower than in the original seat design. This avoids the necessity for renewed registration of a vehicle or even only the amendment of a registration of a vehicle.

Even a displacement of the vehicle seat 130 in the sense of the double-headed arrow 148 (FIG. 6B) has no influence on the weighing signals determined by the load cells 140.

If the sitting area 142 is tilted forward, i.e. the height adjustment of the supporting frame 134 is performed less at the front than in the rear region, or vice versa, the center of gravity of the person sitting on the seat 130 is automatically shifted as a result. On account of four loads cells being disposed on the seat 130, this shifting of the weight can be registered as shifting of the center of gravity, and, on the basis of this, possibly changed force bypasses can be taken into account in the evaluation.

What is claimed is:

1. A load cell comprising a force transducer for recording a weight, the force transducer comprising a part which does not deform under loading and a force introduction part with an elastically deformable part, the elastically deformable part and the non-deforming part each comprising a measuring portion, the measuring portions defining a spaced relationship of the elastically deformable part and the non-deforming part to each other, said spaced relationship changing under loading, at least one of said measuring portions comprising a recess, and a sensor arrangement, the sensor arrangement comprising an inductively operating sensor element and a signaling face, the sensor element being disposed in the recess aligned toward and opposite said signaling face, said sensor element adapted to detect changing of the spaced relationship as an electric signal, the force transducer further comprising a circuit for converting the electric signal into a weighing signal, the sensor element being shielded against external electromagnetic fields and being encapsulated, and wherein the load cell operates on the eddy current principle.

2. The load cell according to claim 1, wherein the recess is disposed in the non-deforming part of the force transducer and the signaling face is disposed on the elastically deformable part.

3. The load cell according to claim 1, wherein the recess with the sensor element is cast with a curable material for encapsulation.

4. The load cell according to claim 1, wherein the sensor element is encapsulated in a separate housing and is disposed with the housing in the recess.

5. The load cell according to claim 4, wherein the recess is a bore and has a stop for exact positioning of the sensor element with the housing.

6. The load cell according to claim 4, wherein the recess is a bore and wherein the housing of the sensor element has a stop for the exact positioning within the bore.

7. The load cell according to claim 6, wherein the stop is formed as a collar protruding from the housing.

8. The load cell according to claim 5, wherein the housing comprises a substantially cylindrical shape and comprises an external thread on the cylindrical shape, and wherein the bore of the recess comprises an internal thread complementary to said external thread.

9. The load cell according to claim 1, wherein the sensor element comprises a sensor coil disposed in a ferrite core, the ferrite core comprising an open end facing the signaling face.

10. The load cell according to claim 9, wherein the ferrite core is formed as at least one of a cup core, an E core and a U core comprising said open end.

11. The load cell according to claim 1, wherein the force transducer further comprises a frame, the elastically deformable part and the non-deforming part being fixed to the frame and being produced in one piece from a metallic material.

12. The load cell according to claim 11, wherein the metallic material is a hardenable lightweight metal alloy.

13. The load cell according to claim 1, wherein the circuit comprises an oscillator circuit associated with the sensor element, the oscillator circuit optionally being disposed alongside the sensor element and in the recess together with the sensor element in an encapsulated manner.

14. The load cell according to claim 13, wherein the sensor element is a frequency-determining part of the oscillator circuit.

15. The load cell according to claim 1, wherein the signaling face comprises a composite ferrite-polymer sheet.

16. The load cell according to claim 1, wherein the non-deforming part of the force transducer comprises a mechanical stop for limiting the deformation of the elastically deformable part of the force introduction part.

17. The load cell according to claim 16, wherein the force transducer comprises a mechanical stop for limiting the deformation of the elastically deformable part when compressive and tensile forces act on the force introduction part.

18. The load cell according to claim 1, wherein the sensor arrangement is disposed and encapsulated in the recess.

* * * * *